United States Patent [19]

Kasowski et al.

[11] Patent Number: 5,276,085
[45] Date of Patent: Jan. 4, 1994

[54] AROMATIC POLYAMIDE COMPOSITIONS AND FIBERS

[75] Inventors: Robert V. Kasowski, West Chester, Pa.; Kiu-Seung Lee, Richmond, Va.; Ying Wang, Wilmington, Del.

[73] Assignee: E. I. Du Pont de Nemours and Company, Wilmington, Del.

[21] Appl. No.: 52,810

[22] Filed: Apr. 23, 1993

[51] Int. Cl.$^5$ ............................................. B28B 11/18
[52] U.S. Cl. .................................... 524/606; 524/879; 264/165
[58] Field of Search ................. 524/606, 879; 264/165

[56] References Cited

U.S. PATENT DOCUMENTS

| | | | |
|---|---|---|---|
| 3,063,966 | 11/1962 | Kwolck et al. | 260/78 |
| 4,987,215 | 1/1991 | Keil et al. | 528/329 |
| 4,987,216 | 1/1991 | Keil et al. | 528/329 |
| 5,084,497 | 1/1992 | Burch, Jr. et al. | 524/173 |
| 5,177,175 | 1/1993 | Kiriyama et al. | 528/183 |
| 5,178,980 | 1/1993 | Mort et al. | 430/58 |

OTHER PUBLICATIONS

Kikuchi, et al., "Isolation and Identification of Fullerene Family: $C_{76}$, $C_{78}$, $C_{82}$, $C_{84}$, $C_{90}$ and $C_{96}$", Chem. Phys. Ltrs., vol. 188, No. 3.4, Jan. 10, 1992.
Shinohara, et al., "Formation and Extraction of Very Large All-Carbon Fullerenes", J. Phys. Chem. 1991, 95, 8449–8451.
Diederich, et al. "The Higher Fullerenes: Isolation and Characterization of $C_{76}$, $C_{84}$, $C_{90}$, $C_{94}$, and $C_{70}O$, an Oxide of $D_{5h}$-$C_{70}$", Sci. vol. 252, pp. 548–551 Feb. 11, 1991.
Kratschmer, et al., "Solid $C_{60}$: A New Form of Carbon", Nature, vol. 347, Sep. 27, 1990, pp. 354–358.
Smart et al., "Extraction of Giant Fullerene Molecules, and Their Subsequentvation in Low Boiling Point Solvents", Chem. Phys. Ltrs., vol. 188, No. 3.4, Jan. 10, 1992.
Trost, et al., "2-Alkoxybenzo-1,3-Dithiole 1,1,3,3-Tetraoxide, A Carbonyl 1,1-Dipole Synthon", J. Am. Chem. Soc. 1984, 106, 2469–2471.
Zhang, et al., "Reactivity of Large Carbon Clusters: Spheroidal Carbon Shells Their Possible Relevance to the Formation and Morphology of Soot", Journal of Phys. Chem., vol. 90, No. 4, Feb. 13, 1986.
Fowler, "How Unusual is C60? Magic Numbers for Carbon Clusters", Chem. Phys. Trs., vol. 131, No. 6 Nov. 21, 1986, pp. 444–450.

Primary Examiner—Morton Foelak
Attorney, Agent, or Firm—Susan Borden Evans

[57] ABSTRACT

The disclosed invention relates to novel aromatic polyamide compositions with a fullerene component and fibers therefrom which have improved torsional strength and a process for preparing said fibers.

5 Claims, No Drawings

AROMATIC POLYAMIDE COMPOSITIONS AND FIBERS

BACKGROUND OF THE INVENTION

This invention relates to polymeric compositions of aromatic polyamides with a fullerene component, and fibers therefrom which have improved torsional strength and a process for preparing said fibers.

Since the isolation of fullerenes by Kratschmer et al., Nature, Vol. 347, pp. 354-358 (1990), the chemistry surrounding fullerenes has been the focus of intense research. Fullerenes have been studied per se and in combination with other substances with the goal of modifying the properties of the resulting compositions.

Copending, commonly assigned, application Ser. No. 07/954,181 describes the use of fullerenes to provide improved photoconductive compositions from both photoconductive and non-photoconductive polymers.

The present invention is directed to providing aromatic polyamides and fullerence compounds which form fibers having improved processability and compression strength as measured by torsional modulus. Of particular commercial importance are aromatic polyamides, processed as fibers, which have uses such as: in composites, cut-resistant gloves, clothes, and cables.

SUMMARY OF THE INVENTION

The present invention provides aromatic polyamide compositions and fibers therefrom of improved torsional strength comprised of an aromatic polyamide, and from about 0.1 to about 20% by weight, based on the weight of the polyamide, of a fullerene compound. Also comprehended by this invention is a process for preparing an aromatic polyamide fiber with improved torsional strength, comprising in-situ polymerization of aromatic polyamide in the presence of fullerene compound to incorporate an "effective" amount of the fullerene.

DETAILS OF THE INVENTION

Fibers prepared from the polymeric composition of the present invention have improved torsional strength as compared to un-doped polyamides and as measured by torsional modulus.

Torsional modulus, $\tau$, is defined as:

$$\tau = \frac{0.64}{r^4} \frac{\text{torque}}{\text{angle of twist}} \quad (1)$$

and $$r = 5.9 \times 10^{-4} \sqrt{\frac{D}{\rho}} \quad (2)$$

where D and $\rho$ are the denier and the density of the fiber, respectively. Torsional modulus of the fiber can therefore be determined by measuring the initial slope of a plot of torque versus angle of twist. Angle of twist versus torque measurements can be done on fibers with different denier, and the results are substituted into equations (1) and (2) to obtain torsional modulus.

There is usually a correlation between torsional strength and compression strength. Improving the torsional strength of a material can, although not always, also improve the compression strength.

Fullerene compounds of the present invention include fullerenes in the substituted and unsubstituted form. The terms fullerene and fullerene compound are herein used interchangeably.

The fullerene compound useful in the compositions and fibers of this invention can be made by the procedure described by Kratschmer et al., Nature 347-354 (1990). The fullerenes useful in this invention may have an extremely broad range of carbon atoms. Useful fullerene compounds may have 20-1000 carbon atoms, or mixtures thereof, preferably fullerene compounds having 60 or 70 carbon atoms, or mixtures thereof, but can be any stable form of the fullerene as described in Zhang et al., J. Phys. Chem. Vol. 90, p. 525 (1986); Newton et al., J. Am. Chem. Soc., Vol. 108, p. 1469 (1984); Fowler, Chem. Phys. Lett., Vol. 131, p. 444-450 (1986). It is also permissible to utilize any substituted form of fullerene, so long as the substitution is such that the electron accepting character of the molecule remains in tact. Fullerene compounds obtained in accordance with the methods set forth in Kratschmer et al., may contain mixtures of $C_{60}$ and $C_{70}$ and small amounts of impurities.

The concentration of fullerene in the compositions of the present invention is from about 0.1 to about 20% by weight, preferably 0.1 to about 5% by weight, more preferably less than 5% by weight of aromatic polyamide.

Methods of preparation wherein fullerenes can be incorporated (i.e., doped) into these aromatic polyamides include: (i) in-situ polymerization, (ii) dissolving both fullerenes and polyamide in a common solvent, or (iii) where the polyamide melts upon heating rather than decomposing, one may dissolve the fullerene into the polyamide melt. Method (i) is preferred (Example 1) particularly for incorporation of higher amounts of fullerene into the composition, wherein fullerene is added to the monomeric precursor of the aromatic polyamide. Fibers can be prepared from the resulting compositions described below.

Examples of common solvents for use in method (ii) include: N-methylpyrrolidone (NMP), Dimethylacetamide (DMAC), and Dimethylformamide (DMF).

Many aromatic polyamides are used in the form of fibers and films. The fiber can mean finite length or continuous, single filament or yarn and the yarn can be monofilament or multifilament yarn. Fibers may be formed by wet spinning of an aromatic polyamide solution, while films may be formed by casting a thin layer of the aromatic polyamide solution. In both cases, the aromatic polyamide solution is usually contacted with a nonsolvent such as water, which removes the solvent swelling the aromatic polyamide and hence coagulates the aromatic polyamide into a solid polymer, for example as a fiber or film creating a solvent swollen aromatic polyamide. Hence in this type of process the water is often called a coagulant. A convenient method of contacting the solvent swollen aromatic polyamide with a solution of a fullerene compound, is the use of a fullerene containing solution as the coagulant in the process of forming fibers and films. Another convenient method of contacting the aromatic polyamide with a fullerene solution is to contact a "never dried" aromatic polyamide with the fullerene solution.

A "never dried" aramid means an aramid coagulated from a solution by contact with a nonsolvent (usually an aqueous bath of some sort, such as water or an aqueous solution). When contacted with the nonsolvent, the polymer coagulates and most of the solvent is removed structure, which usually contains about 150-200% by weight of the aramid of nonsolvent (again, usually water). It is this open sponge-like structure, which has imbibed the nonsolvent, which is referred to herein as "never dried aramid".

The aromatic polyamide is then dried to produce the final article (fiber or film). Drying is typically done by the removal of excess water and aromatic polyamide solvent mechanically, and then the removal of the residual water and solvent by vaporization, as by heating. Typical wet fiber spinning procedures for aromatic polyamides are known to the art skilled and are described in H. Mark, et al., Ed., Encyclopedia of Polymer Science and Technology, Vol. 6, John Wiley & Sons, New York, 1986, pp. 802-839, which are hereby included by reference.

Aromatic polyamides particularly useful herein include poly(p-phenyleneterephthalamide), and poly(m-phenyleneisophthalamide) because of their proven utility for bullet-proof vests, engineering composites, fire proof apparel, cut resistant gloves, cables and the like.

End uses for the fibers of improved torsional strength include: composites, cut-resistant gloves, fire resistant clothes, and cables.

In the Examples, the following abbreviations are used:

MPD-I—poly(m-phenylene isophthalamide) (Nomex ®)
PPD-T—poly(p-phenylene terephthalamide) (Kevlar ®)
hrel—relative velocity
TCI—terephaloyl chloride
PPD—(p-phenylene diamine)
IV—inherent viscosity

PREPARATION OF FULLERENES

In accordance with the methods set forth in Kratschmer et al. *Nature*, pp. 347-354 (1990) $C_{60}$ and $C_{70}$ fullerenes are prepared. $\frac{1}{4}''$ graphite rods are evaporated in an evaporator under 150 torr of helium by passing electrical currents of 120 amperes at 20 volts through the rods. The black soot generated is collected and then extracted with toluene in a Soxhlet tube to obtain fullerenes containing mixtures of $C_{60}$, $C_{70}$ and small amount of impurities. To separate the $C_{60}$ and $C_{70}$ fullerenes, mixtures of these fullerenes are dissolved in either hexane, 5% toluene/hexane, or 20% toluene/hexane. The resulting solution is passed through a column containing neutral alumina. $C_{60}$ (purple color) comes out of the column first, followed by $C_{70}$ (orange brown). The "$C_{60}/C_{70}$ Fullerene" utilized in Example 1 below is prepared by the electric arc method described above.

POLYMERIZATION OF PPD-T IN THE Presence of Fullerenes

A. Preparation of Fullerene Solution in NMP 0.55 grams of $C_{60}/C_{70}$ fullerene was added to 5 ml of dried NMP in a small Erlenmeyer flask. The mixture was agitated overnight at room temperature in order to dissolve the fullerene in NMP. This solution was kept agitated in drybox until used for the polymerization.

B. In-situ Polymerization of PPD-T in the Presence of Fullerene

In a polymerization kettle, add (1) 75 grams of solvent premix containing NMP (N-methyl pyrrolidone) and $CaCl_2$. Percent $CaCl_2$ (w/w):8.72%, (2) 4.663 grams of PPD (p-phenylene diamine) flake, (3) fullerene solution prepared above. Set up the kettle equipped with nitrogen inlet and outlet, an agitator, ingredient addition port, and stir until all the solid particles are completely dissolved. Place ice water bath under the kettle and cool the mixture until the temperature reaches below 50° C. Add 8.779 grams of TCI (terephthaloyl chloride) into the reaction kettle and agitate vigorously until maximum viscosity is reached. The polymer is precipitated out as crumb in a few minutes after the content reaches the maximum viscosity. Agitate 30 more minutes to complete the polymerization. Disassemble the kettle assembly and transfer the polymer/fullerene blend to the "Waring Blender" and wash with 500 ml of water to remove the solvent and HCl generated by the reaction. Filter the polymer and repeat the washing four more times. Dry the polymer in convection oven for 2-3 hours at 125° C. Inherent viscosity measured in sulfuric acid was 5.47. Inherent Viscosity (IV) is defined by the equation:

$$IV = \ln(hrel)/c$$

where c is the concentration (0.5 gram of polymer in 100 ml of solvent) of the polymer solution and hrel (relative viscosity) is the ratio between the flow times of the polymer solution and the solvent as measured at 30° C. in a capillary viscometer. The inherent viscosity values reported and specified herein are determined using concentrated sulfuric acid (96% by weight $H_2SO_4$).

EXAMPLE 2

The Preparation of PPD-T/Fullerene Fibers

Sulfuric acid having a concentration of 101% (81.5 parts) was stirred and cooled in a closed vessel to $-5°$ C. Poly(p-phenylene terephthalamide)/fullerene in-situ blend (19.5 parts) prepared above was added to the vessel. The mixture of polymer and acid was stirred while the temperature was gradually increased to 85° C. The mixture was stirred for two hours at 85° C. under a reduced pressure of 25 mmHg to eliminate air bubbles. The resulting dope was extruded through a 3-hole spinneret having orifice diameters of 3 mil (0.076 mm); and the extruded dope was drawn through an air gap of 0.7 cm length into an aqueous coagulating bath at 5° C. and wound up. The extruded dope was stretched 3.5 times in one case and 7 times in the other in the air gap. The resulting fiber was washed with dilute aqueous alkali and water, dried on a roll at 180° C., and wound up. For these fibers, the fullerene concentration was 5.36% based on weight of PPD-T. The color of the fibers is black as compared to the yellowish color of undoped PPD-T fiber. The filament linear density was 4.1 denier for a stretch factor of 3.5 and 2.5 denier for a stretch factor of 7.

The torsional moduli of fullerene-doped "Kevlar" fibers are determined to be 2.2 for the 2.5 denier fiber and 2.7 Gpascal for the 4.1 denier fiber by measuring twist angle versus torque. Compared to the torsional modulus of an otherwise equivalent undoped "Kevlar" fiber, 1.7 Gpascal, there is an enhancement of ~29 to ~59%.

Differential scanning calorimetry on the 2.5 denier fullerene-doped Kevlar fiber shows there is a significant decrease of ~20° C. for the water evaporation temperature compared to undoped "Kevlar" fiber.

What is claimed is:

1. A process for preparing an aromatic polyamide/fullerene compound fiber with improved torsional modulus, comprising in-situ polymerization of aromatic polyamides in the presence of a fullerene compound to incorporate an "effective" amount of fullerene compound into the fiber to be spun and thereafter spinning said polymerized mixture into a fiber.

2. A process according to claim 1 wherein the fullerene compound has from about 60 to 70 carbon atoms and is present in an amount of from about 0.1 to about 5% by weight of the polyamide.

3. A process according to claim 2 wherein the fullerene compound is present in an amount of less than 5% by weight of the polyamide.

4. A process according to claim 2 wherein the polyamide is selected from poly(p-phenylene terephthalamide and poly(m-phenylene isophthalamide).

5. A process according to claim 4 wherein the polyamide is poly(p-phenylene terephthalamide) and the fullerene compound is $C_{60}/C_{70}$ fullerene.